United States Patent [19]

Adiletta

[11] Patent Number: 5,156,661
[45] Date of Patent: Oct. 20, 1992

[54] BAG FILTER WITH THERMOPLASTIC TAPE-SEALED SEWN SEAM

[75] Inventor: Joseph G. Adiletta, Thompson, Conn.

[73] Assignee: Pall Corporation, Glen Cove, N.Y.

[21] Appl. No.: 828,505

[22] Filed: Jan. 31, 1992

[51] Int. Cl.$^5$ ............................................. B01D 46/02
[52] U.S. Cl. ........................................ 55/381; 55/382; 55/502; 55/528
[58] Field of Search .................. 55/381, 382, 502, 511, 55/514, 528, 525

[56] References Cited

U.S. PATENT DOCUMENTS

| | | | |
|---|---|---|---|
| 3,419,151 | 12/1968 | Smith et al. | 55/382 X |
| 3,422,602 | 1/1969 | Janson | 55/381 X |
| 4,540,625 | 9/1985 | Sherwood | 55/528 X |
| 4,589,894 | 5/1986 | Gin et al. | 55/382 X |
| 4,959,045 | 9/1990 | Hartley et al. | 55/381 X |
| 4,969,999 | 11/1990 | Riddell | 55/525 X |

Primary Examiner—Charles Hart
Attorney, Agent, or Firm—Leydig, Voit & Mayer

[57] ABSTRACT

A bag filter comprising at least one sheet of a filter medium, preferably a polypropylene high dirt capacity filter medium, formed into a bag configuration with an opening, an inside surface, an outside surface, and at least one seam formed at adjoining filter medium portions which have been sewn together, wherein said seams are sealed with a thermoplastic tape that has been heat-sealed to the adjoining filter medium portions. A method of preparing such a bag filter is also provided herewith.

42 Claims, No Drawings

BAG FILTER WITH THERMOPLASTIC TAPE-SEALED SEWN SEAM

TECHNICAL FIELD OF THE INVENTION

This invention relates to a bag filter comprising at least one sheet of a filter medium formed into a bag configuration with sewn seams, wherein a thermoplastic tape has been heat-sealed to the adjoining portions of the filter medium at the seams. The present invention also concerns a method of preparing such a bag filter.

BACKGROUND OF THE INVENTION

Bag filters are typically formed from sheets of flexible material which are joined together, usually by sewing such sheets together. For example, bag filters prepared from high dirt capacity polypropylene filter media sheets which have been sewn together are commercially available from Pall Corporation (Glen Cove, N.Y.) under the trademark Profile ®.

While in most uses the sewn seams of such bag filters do not affect the integrity of the bag filters, there are some instances in which the sewn seams of conventional bag filters can become leakage pathways depending upon the nature of the fluids being filtered and the pressure at which filtration is being effected. Although sewn seams may sometimes become leakage pathways, thereby allowing unfiltered fluid to bypass the filter media, the prevailing conventional practice of preparing bag filters continues to involve sewn seams. This preference is the result of the need for the existence of a strong mechanical bond between the filter medium portions joined together to form the bag filter so as to enable such bag filters to be used in rugged environments. Such a strong mechanical bond cannot generally be provided by gluing or heat-sealing the filter medium sheets instead of stitching such sheets together. The published prior art literature similarly discloses the prevailing preference of using stitching to prepare bag filters and the like.

For example, U.S. Pat. No. 3,422,602 discloses a bag filter for a gas cleaning apparatus. The bag filter is formed of filter material sheets, such as glass fiber layers, which are stitched together so as to compress the filter material sheets and form substantially air-tight seams. As an alternative, instead of stitching the edges of the filter material sheets together, the edges may be glued or heat-sealed together.

Similarly, U.S. Pat. No. 4,959,045 discloses a method of making a filter sock, wherein the projecting side of a panel of two leaves is folded back over the free side and the sides are sewn together to form a tube.

There remains, therefore, a need for a bag filter with seams constructed in such a manner so as not to allow the fluid being filtered to bypass the filter medium by way of the seams, while at the same time providing for a good mechanical bond at the bag filter seams. The present invention provides such a bag filter.

BRIEF SUMMARY OF THE INVENTION

It is an object of the present invention to provide a bag filter prepared from at least one sheet of a filter medium, preferably a high dirt capacity filter medium, which has been formed into a bag configuration by joining together portions of the filter medium in a way which provides for a good mechanical bond without providing fluid leakage pathways.

It is another object of the present invention to provide a method of preparing a bag filter having seams which have a high mechanical strength but nevertheless do not provide fluid leakage pathways.

These and other objects and advantages of this invention, as well as additional inventive features, will become apparent from the description of the present invention provided herein.

The present invention concerns a bag filter comprising at least one sheet of a filter medium formed into a bag configuration with an opening, an inside surface, an outside surface, and at least one seam formed at adjoining filter medium portions which have been sewn together. The seams of the bag filter are sealed with a thermoplastic tape that has been heat-sealed to the adjoining filter medium portions. For example, the seams may be covered on at least one side, such as the outside surface, with the heat sealed thermoplastic tape. Alternatively or in addition, the thermoplastic tape may be in said seams, for example, between the adjoining filter media portions.

The present invention also contemplates a method of preparing such bag filters by taking at least one sheet of a filter medium, stitching filter medium portions together to form a bag with an opening, an inside surface, an outside surface, and at least one seam formed at adjoining filter medium portions which have been sewn together, contacting the seams with a thermoplastic tape, and then heat-sealing the thermoplastic tape to the adjoining filter medium portions.

DETAILED DESCRIPTION OF THE PREFERRED EMBODIMENTS

The present inventive bag filter comprises at least one sheet of a filter medium formed into a bag configuration with an opening, an inside surface, an outside surface, and at least one seam formed at adjoining filter portions which have been sewn together. The seams of the bag filter are sealed with a thermoplastic tape that has been heat-sealed to the adjoining filter medium portions.

The present inventive method of preparing such bag filters involves taking at least one sheet of a filter medium, stitching filter medium portions together to form a bag with an opening, an inside surface, an outside surface, and at least one seam formed at adjoining filter medium portions which have been sewn together, contacting the seams with a thermoplastic tape, and then heat-sealing the thermoplastic tape to the adjoining filter medium portions.

The bag filter may be of any suitable configuration and size. Conventional bag filters are roughly cylindrical in shape and are available in sizes of 4 inch diameter by 9 inch length and 4 inch diameter by 15 inch length.

The filter medium may be any suitable filter sheet material which can be sewn and heat-sealed with a suitable thermoplastic tape. However, although the filter medium may comprise a lower grade filter material, the filter medium is preferably a high dirt capacity filter medium, most preferably of polypropylene. The preferred high dirt capacity filter medium comprises a melt-blown fibrous web of polypropylene fibers intertwined and layered on a porous polypropylene substrate, such as is used in the Profile ® bag filters available from Pall Corporation (Glen Cove, N.Y.).

The porosity of the filter medium of the bag filter may be any desired value. The bag filter preferably has a tapered or graded pore structure with decreasing pore size from the inside surface of the bag filter to the outside surface of the bag filter (which will be the usual direction of filtration flow).

The bag filter may comprise other layers in addition to the filter sheet material, such as an inner liner and outer wrap of a non-woven material such as of polypropylene.

The bag filter may be formed from one or more sheets of filter medium. The number of sheets employed will depend in part upon the ultimate shape of the bag filter and its use. In most instances, a bag filter can be prepared with only one or two filter medium sheets which will desirably minimize the extent of seams. Most preferably, the bag filter is constructed from a single sheet of filter medium, thereby resulting in the existence of only a single seam joining the edges of the sheet so as to leave an open end. In all cases, the overall shape of the bag filter should be such that a particular seam or area of a seam is not subjected to added stress through use that would destroy the integrity of the seam.

The material, size, and nature of the thread used to join filter medium portions to form the bag filter depends upon the filter medium, the other materials which may be used to form the bag filter, and the ultimate use of the bag. The thread preferably is of the same material as the filter medium, e.g., polypropylene.

The number of stitches/inch used to join the filter medium portions of the bag filter will vary with the filter medium, the number of layers of filter medium, the thread, the type of stitching, and the ultimate use of the bag filter. It is important that sufficient stitches be employed to ensure an adequate mechanical bond between adjoined filter medium portions, while, however, ensuring that the number of stitches/inch is not such that the stitching results in the perforation or weakened integrity of the filter medium.

The manner in which the seam on the bag filter is sewn may be varied. For example, the seam may be straight-stitched, with a binder strip preferably inserted between the edges of the filter medium prior to sewing the seam, or the seam may be over-stitched. When used, the binder strip is preferably of the same type of material as the filter medium and/or thread, e.g., polypropylene.

The seam on the bag filter is sealed with thermoplastic tape. Any suitable thermoplastic tape may be used, preferably a thermoplastic tape which has a melting temperature lower than the melting temperature of the filter medium and/or thread of the bag filter and which will provide a suitable seal with the adjoined filter medium portions. In the case in which a polypropylene filter medium is used in the formation of the bag filter, the thermoplastic tape is preferably a polypropylene copolymer having a melting temperature below that of polypropylene, e.g., a polypropylene-polyethylene copolymer.

It should be kept in mind that the choice of thermoplastic tape will depend in part upon the amount of heat and pressure that can be applied to the thermoplastic tape on the filter medium to effect the heat-seal without disrupting the integrity of the bag filter. The choice of thermoplastic tape also will depend on the ultimate use of the bag filter. For example, the bag filter may be used under conditions that may adversely affect the heat-seal effected between the thermoplastic tape and the filter medium, in which case it will be necessary to choose an appropriate thermoplastic tape to withstand the anticipated operating conditions.

Another consideration in the choice of the thermoplastic tape is its width. The width of the tape must be sufficient to effectively cover and seal the seam.

The thermoplastic tape may be applied to either the inside or the outside surface of the bag filter. Alternatively, or in addition, the thermoplastic tape may be inserted between the adjoining filter medium portions prior to stitching them together. It is preferred that the thermoplastic tape be applied to cover the seam on the outside surface of the bag filter. The thermoplastic tape is preferably positioned such that the seam is midway between the edges of the tape. Furthermore, the thermoplastic tape preferably extends beyond the ends of the seam, where possible.

Once the thermoplastic tape has been properly positioned with respect to the seam, the thermoplastic tape is subjected to sufficient heat and pressure to effect a heat-seal between the thermoplastic tape and the adjoining filter medium portions. The amount of heat and pressure required to heat-seal the tape will depend in part on the particular thermoplastic tape and filter medium used in the bag filter. The applied heat and pressure, of course, should not be so great as to destroy the integrity of the bag filter. In the preferred embodiment wherein a polypropylene copolymer thermoplastic tape is utilized, hot air of about 280°-300° F. or so may be used to heat the thermoplastic tape on the bag filter which is then passed through rollers to effect the heat-seal.

A suitable collar may be sewn onto the open end of the bag filter, with the resulting seam being treated as described above with respect to adjoining filter medium portions. The collar may be of any suitable material, generally an elastomeric compound of the same general type as used in the filter medium. When a polypropylene filter medium is utilized, then the collar material is preferably made of a polypropylene material, e.g., a polypropylene copolymer such as Santoprene ® (Monsanto).

If a collar is attached to the open end of the bag filter, care should be exercised in choosing the thermoplastic tape and the stitch length to ensure that the collar is not perforated and that the thermoplastic tape effectively heat-seals to both the filter medium and the collar.

The bag filter manufactured in accordance with the method of the present invention has a variety of suitable end uses. In particular, the bag filter may be used to filter paints and coatings, especially water-based paints and primers, chemicals, petrochemical products, water, aqueous solutions and suspensions, and the like. The utility of the bag filter is in no way limited to these uses and includes most uses for conventional bag filters.

The following example serves to further illustrate the present invention but is not intended to limit the scope of the invention.

EXAMPLE 1

Filter bags of 5, 10 and 20 $\mu$m pore ratings were prepared in accordance with the present invention. Each of the bag filters were constructed in a similar manner. A single sheet of a high dirt capacity polypropylene filter medium with a graded pore structure, together with non-woven, non-fiber shedding, polypropylene inner liner and outer wrap, were stitched together using a polypropylene thread (size #69) along the top (collar) edge in the flat, prior to being stitched on the side and bottom in a single seam to form a bag configuration of sizes 4 inch diameter by 9 inch length and 4 inch diameter by 15 inch length.

A polypropylene binder strip was stitched into the seams. The binder strip was 1¼ inches wide, with both edges folded under to yield a ¾-inch wide strip.

The bag filter was sewn inside-out with a sewing machine using a single chain stitch of 7-11 stitches/inch with a minimum thread tension of 12 oz. and a minimum bobbin tension of 6 oz. The minimum tensions set on the sewing machine are necessary to ensure tight seams. The needle used did not exceed 140 Nm in size.

The edges of the sheet of the filter medium were stitched as close as practical to the edge of the binder strip. No gaps were allowed in the seam, and all layers comprising the bag filter were captured in the seam. Thread ends were cut approximately ½ inch long.

Since a collar was to be attached to the open end of the bag filter, the diameter of the bag filter was narrowed to the diameter of the collar, beginning 1½ inches from the open end of the bag filter.

After sewing and trimming the threads, the bag filter was turned inside-out. The bottom and side seam were pushed out to provide a well-defined contour to the bag. The bottom contour was checked for symmetry.

A collar of Santoprene ® (Monsanto) was attached to the open end of the bag with a lock stitch (5-8 stitches/inch) located ⅛-¼ inch from the bottom of the collar, with ends of the stitching passing each other circumferentially at least ½ inch. It was ensured that the stitching was not so tight as to perforate the collar. Thread ends at the collar were trimmed to within ⅛ inch.

Thermoplastic tape (¾ inch wide) of a polypropylene copolymer having a melting temperature below that of polypropylene was applied to the seam on the outside surface of the bag filter. The thermoplastic tape was positioned such that the tape was centered over the seam. The tape was then heat-sealed to the seam using hot air and then passing the bag filter through rollers.

The same type of thermoplastic tape was similarly applied to the collar seam on the outside surface of the bag filter using hot air and rollers. The tape covered the seam completely and adhered to both the collar and filter bag over the seam. The thermoplastic tape on the collar seam overlapped the tape end of the side seam of the filter medium.

The thermoplastic tape adhered firmly to the bag filter throughout its length and did not peel off when rubbed with the fingers. No areas of overheating of the filter material and thermoplastic tape, evidenced by embrittlement adjacent to the taped seam and by translucent areas in the area of the seam when exposed to light, were observed.

EXAMPLE 2

A polypropylene Profile ® bag filter was obtained from Pall Corporation (Glen Cove, N. Y.). The sewn seams of the bag filter were covered with a thermoplastic tape comprising a polypropylene copolymer having a melting temperature lower than that of polypropylene, and the thermoplastic tape was heat-sealed to the filter medium and collar of the bag filter by application of hot air to the thermoplastic tape, followed by application of moderate pressure to the heated thermoplastic tape. An improved, thermoplastic tape-sealed sewn bag filter was thereby obtained.

While this invention has been described with emphasis upon preferred embodiments, it will be obvious to those of ordinary skill in the art that the preferred bag filter and method of preparing such a bag filter may be varied. It is intended that the invention may be practiced otherwise than as specifically described herein. Accordingly, this invention includes all modifications encompassed within the spirit and scope of the following claims.

What is claimed is:

1. A bag filter comprising at least one sheet of a filter medium formed into a bag configuration with an opening, an inside surface, an outside surface, and at least one seam formed at adjoining filter medium portions which have been sewn together with thread, wherein said seams are sealed with a thermoplastic tape that has been heat-sealed to the adjoining filter medium portions.

2. The bag filter of claim 1, wherein said seams are covered on at least one side with said thermoplastic tape that has been heat-sealed to the adjoining filter medium portions.

3. The bag filter of claim 1, wherein said filter medium comprises a high dirt capacity filter medium.

4. The bag filter of claim 3, wherein said high dirt capacity filter medium comprises a substrate with entangled fibers deposited thereon.

5. The bag filter of claim 4, wherein said substrate and said entangled fibers are of the same material.

6. The bag filter of claim 5, wherein said high dirt capacity filter medium comprises polypropylene.

7. The bag filter of claim 6, wherein said thread comprises polypropylene.

8. The bag filter of claim 7, wherein said thermoplastic tape comprises polypropylene.

9. The bag filter of claim 8, wherein said thermoplastic tape comprises a polypropylene copolymer having a melting temperature lower than the melting temperature of said filter medium.

10. The bag filter of claim 1, wherein said thermoplastic tape has a melting temperature lower than the melting temperature of said filter medium.

11. The bag filter of claim 4, wherein said substrate forms the inside surface of said bag filter.

12. The bag filter of claim 11, wherein said seams are covered on at least the outside of said bag filter with said thermoplastic tape that has been heat-sealed to the adjoining filter medium portions.

13. The bag filter of claim 12, wherein said seams are only covered on the outside of said bag filter with said thermoplastic tape that has been heat-sealed to the adjoining filter medium portions.

14. The bag filter of claim 1, wherein said thermoplastic tape is in said seams between the adjoining filter medium portions.

15. The bag filter of claim 1, wherein said bag filter further comprises a collar sewn onto the open end of said bag filter with at least one seam at the junction of said collar and said filter medium, wherein said seams are sealed with a thermoplastic tape that has been heat-sealed to the adjoining portions of said filter medium and said collar.

16. The bag filter of claim 15, wherein said collar comprises an elastomeric material.

17. The bag filter of claim 16, wherein said filter medium comprises a high dirt capacity filter medium of a polypropylene substrate with entangled polypropylene fibers deposited thereon and said collar comprises a polypropylene copolymer.

18. The bag filter of claim 3, wherein said high dirt capacity filter medium has a graded pore structure.

19. The bag filter of claim 18, wherein said pores of said high dirt capacity filter medium increase from said inside surface to said outside surface of said bag filter.

20. The bag filter of claim 4, wherein said bag filter further comprises a binder strip between adjoining filter medium portions.

21. The bag filter of claim 20, wherein said binder strip is polypropylene.

22. The method of preparing a bag filter comprising stitching portions of at least one sheet of a filter medium together to form a bag with an opening, an inside surface, an outside surface, and at least one seam formed at adjoining filter medium portions which have been sewn together, contacting said seams with a thermoplastic tape, and then heat-sealing said thermoplastic tape to the adjoining filter medium portions.

23. The method of claim 22 wherein contacting said seams with a thermoplastic tape includes covering at least one side of said seams with said thermoplastic tape.

24. The method of claim 22, wherein said filter medium comprises a high dirt capacity filter medium.

25. The method of claim 24, wherein said high dirt capacity filter medium comprises a substrate with entangled fibers deposited thereon.

26. The method of claim 25, wherein said substrate and said entangled fibers are of the same material.

27. The method of claim 26, wherein said high dirt capacity filter medium comprises polypropylene.

28. The method of claim 27, wherein said thread comprises polypropylene.

29. The method of claim 28, wherein said thermoplastic tape comprises polypropylene.

30. The method of claim 29, wherein said thermoplastic tape comprises a polypropylene copolymer having a melting temperature lower than the melting temperature of said filter medium.

31. The method of claim 22, wherein said thermoplastic tape has a melting temperature lower than the melting temperature of said filter medium.

32. The method of claim 25, wherein said substrate forms the inside surface of said bag filter.

33. The method of claim 32, wherein said seams are covered on at least the outside of said bag filter with said thermoplastic tape and said thermoplastic tape is heat-sealed to the adjoining filter medium portions.

34. The method of claim 33, wherein said seams are only covered on the outside of said bag filter with said thermoplastic tape and said thermoplastic tape is heat-sealed to the adjoining filter medium portions.

35. The method of claim 22, wherein said thermoplastic tape is positioned in said seams between the adjoining filter medium portions prior to stitching said adjoining filter medium portions together.

36. The method of claim 22, wherein said method further comprises sewing a collar onto the open end of said bag filter thereby forming at least one seam at the junction of said collar and said filter medium, contacting said collar seams with a thermoplastic tape, and heat-sealing said thermoplastic tape to the adjoining portions of said filter medium and said collar.

37. The method of claim 36, wherein said collar comprises an elastomeric material.

38. The method of claim 37, wherein said filter medium comprises a high dirt capacity filter medium of a polypropylene substrate with entangled polypropylene fibers deposited thereon and said collar comprises a polypropylene copolymer.

39. The method of claim 24, wherein said high dirt capacity filter medium has a graded pore structure.

40. The method of claim 39, wherein said pores of said high dirt capacity filter medium increase from said inside surface to said outside surface of said bag filter.

41. The method of claim 22, wherein said method further comprises positioning a binder strip between adjoining filter medium portions prior to stitching said filter medium portions together and then stitching said binder strip together with said adjoining filter medium portions.

42. The method of claim 41, wherein said binder strip is polypropylene.

* * * * *